(12) United States Patent
Van Aken et al.

(10) Patent No.: US 7,116,336 B2
(45) Date of Patent: Oct. 3, 2006

(54) SYSTEM AND METHOD FOR TRANSFORMING COLOR MEASUREMENT DATA

(75) Inventors: Harold R. Van Aken, Wallkill, NY (US); Shreyance Rai, Morrisville, NC (US); Mark A. Lindsay, Cary, NC (US); Richard J. Knapp, Hillsborough, NC (US)

(73) Assignee: GretagMacbeth, LLC, New Windsor, NY (US)

(*) Notice: Subject to any disclaimer, the term of this patent is extended or adjusted under 35 U.S.C. 154(b) by 93 days.

(21) Appl. No.: 10/729,455

(22) Filed: Dec. 5, 2003

(65) Prior Publication Data

US 2004/0135794 A1 Jul. 15, 2004

Related U.S. Application Data

(60) Provisional application No. 60/431,365, filed on Dec. 6, 2002.

(51) Int. Cl.
G09G 5/02 (2006.01)
G06K 9/00 (2006.01)
G01J 3/42 (2006.01)
H04N 1/46 (2006.01)
G03F 3/08 (2006.01)
G01J 3/46 (2006.01)

(52) U.S. Cl. .................. 345/589; 345/597; 345/600; 358/515; 358/518; 382/162; 382/167; 702/85; 356/326

(58) Field of Classification Search ........... 358/1.15, 358/1.9, 1.16, 515–520; 382/162–167; 345/604, 345/589–592, 597, 600–601, 593, 690; 356/326, 356/332, 416, 419, 73; 702/85
See application file for complete search history.

(56) References Cited

U.S. PATENT DOCUMENTS

| 6,036,317 | A | 3/2000 | Seegers et al. |
| 6,043,894 | A * | 3/2000 | Van Aken et al. .......... 356/425 |
| 6,157,735 | A * | 12/2000 | Holub ........................ 382/167 |
| 6,338,030 | B1 | 1/2002 | Senn et al. |
| 6,439,722 | B1 | 8/2002 | Seegers et al. |
| 6,559,944 | B1 * | 5/2003 | Van Aken et al. .......... 356/425 |
| 6,829,058 | B1 * | 12/2004 | Kumada .................... 358/1.15 |
| 2003/0156283 | A1 * | 8/2003 | Jung et al. .................. 356/326 |

FOREIGN PATENT DOCUMENTS

WO    WO 99/10866    3/1999

* cited by examiner

*Primary Examiner*—Wesner Sajous
(74) *Attorney, Agent, or Firm*—McCarter & English, LLP (57) ABSTRACT

Systems and methods for selectively manipulating and/or restandardizing color measurement or spectral data are provided. The color measurement or spectral data may be advantageously restandardized based on a selected color coordinate system using data transform(s) or delta profile(s). Users of the systems/methods are able to mix or employ color-measuring instrument types more easily and effectively by selectively causing a first instrument produced by a first color-measuring instrument manufacturer to provide color measurement data according to a color measurement standard of another color-measuring instrument manufacturer. Selective transformation of color measurement data gathered by the first manufacturer's color-measuring instrument is facilitated, so that the resultant color measurement data may be evaluated as though it was generated by the other manufacturer's color-measuring instrument.

19 Claims, 3 Drawing Sheets

SYSTEM AND METHOD FOR TRANSFORMING COLOR MEASUREMENT DATA

CROSS-REFERENCE TO RELATED APPLICATION(S)

The present application claims the benefit of a co-pending, commonly assigned non-provisional patent application entitled "System and Method for Transforming Color Measurement Data" which was filed on Dec. 6, 2002 and assigned Ser. No. 60/431,365. The entire contents of the foregoing non-provisional patent application are hereby incorporated by reference.

BACKGROUND

1. Technical Field

The present disclosure is directed to color measurement systems and methods and, more particularly, to systems and methods for multi-standard color-measurement, whereby color-measurements based on a first color measurement standard may be selectively restandardized.

2. Background Art

Color-measuring instruments, such as spectrophotometers and calorimeters, are generally employed in making color measurements in a variety of laboratory and production environments. For example, color measurements are used in determining whether the color of an article being produced meets the applicable color specifications. Color-measuring instruments generally produce color measurement data that is based upon a color coordinate system, e.g., CIELAB. However, even when the same color coordinate system is utilized by color-measuring instruments manufactured by different instrument manufacturers, the color measurements generated by such instruments frequently differ for a variety of reasons.

For example, color-measuring instruments manufactured by different instrument manufacturers may generate different results because the instruments: (i) are calibrated to different standards (e.g., the white standard of NPL vs. the white standard of NIST); (ii) utilize different correction modalities to address linearity of data measurement results; (iii) have physical and/or structural differences that affect color measurements; and/or (iv) employ differing approaches to illumination, e.g., as to bandwidth, wavelength, etc. For purposes of the present disclosure, differences in color measurement data that result from one or more of the structural/functional differences described above (or from other such structural/functional differences) are referred to as resulting from differences in "color calibration standards."

Thus, color measurement data generated by a first color-measuring instrument may not be directly comparable to color measurement data from a second color-measuring instrument based on differing color calibration standards. Indeed, the color measurement data generated by the first color-measuring instrument may be characterized by a first centroid, whereas the color measurement data generated by a second color-measuring instrument may be characterized by a second centroid, wherein the first and second centroids are characteristics of the respective color-measuring instruments.

The ability to compare color measurement data is often of significant importance in commercial applications of color-measuring instruments. Color performance is often used as a litmus test for manufacturing quality. The importance of color measurement data assessment is heightened by challenges associated with multi-site enterprises, extended supply chains, compressed cycle times, and limits on resources and expertise in the field of color measurement and management. For example, it may be desirable to produce parts of the same color at multiple locations with the business requirement that the parts match in color when assembled. Color matching is also important in production of replacement parts. Because color-measuring instruments produced by different manufacturers are frequently subject to different color calibration standards, fundamental difficulties arise in comparing color measurement data generated by spectrophotometers/colorimeters from different manufacturers.

Thus, a user at one location measuring a color sample using a color-measuring instrument from a particular manufacturer is likely to obtain color measurement data that is different from the color measurement data obtained by a user measuring the same color sample at a different location using a color-measuring instrument produced by another manufacturer. Similarly, matching colors may become difficult where the standard color specifications are generated based on color calibration standards employed by a color-measuring instrument produced by a first manufacturer, while another manufacturer's instrument is to be used to test the article being produced.

Accordingly, systems and methods are desired whereby color measurement data generated by different color-measuring instruments could be selectively standardized to a desired color calibration standard. In addition, systems/methods for automatically transforming spectral data as part of a communication regimen between color-measuring instruments is needed to enhance operations that involve or rely upon color measurements, e.g., operations that are situated at multiple locations and/or that are using color-measuring instruments from different manufacturers.

SUMMARY OF THE DISCLOSURE

The present disclosure provides advantageous systems and methods for selectively manipulating and/or restandardizing color measurement or spectral data such that color measurement or spectral data may be restandardized based on a selected color calibration standard. According to exemplary embodiments of the disclosed systems and methods, users are able to mix or employ color-measuring instrument types more easily and effectively by selectively causing a first instrument produced by a first color-measuring instrument manufacturer to provide color measurement data according to a color measurement standard of another color-measuring instrument manufacturer. The disclosed systems and methods advantageously facilitate selective transformation of color measurement data gathered by the first manufacturer's color-measuring instrument, so that the resultant color measurement data may be evaluated as though it was generated by the other manufacturer's color-measuring instrument.

Accordingly, in an exemplary embodiment of the present disclosure, a method is provided that includes the steps of: (i) providing a data transform or delta profile for restandardizing color measurement data from a first color calibration standard to a second color calibration standard, (ii) obtaining color measurement or spectral data using a first color measuring instrument based on the first color calibration standard; and (iii) selectively transforming the color measurement or spectral data using the data transform/delta profile, so as to restandardize the color measurement or spectral data to the second color calibration standard. The data transform may be based on obtaining typical color measurement profiles based on the first and second color calibration standards, and generating a conversion algorithm for restandardizing color measurement or spectral data based thereon. Generally, the typical color measurement profiles are generated using first and second color-measuring instruments manufactured by different instrument manufacturers.

The data transform or delta profile is typically stored in an appropriate computer memory, and is accessed from the computer memory on an as-needed basis by an associated processor when data transformation is desired by a user. The computer memory may be located at a central location, e.g., a master color laboratory, or on-site, e.g., in computer memory associated with a local workstation that cooperates with a color-measuring instrument.

Thus, in accordance with the principles of the present disclosure, color-measurement data generated using a first color-measuring instrument may be selectively restandardized using a data transform. According to preferred embodiments of the present disclosure, a plurality of data transforms or delta profiles are accessible by a user such that color measurement or spectral data may be restandardized to multiple color calibration standards. Thus, the centroid of color measurement data generated using a first color-measuring instrument may be selectively transformed to one or more alternative centroids. The data transformation may be initiated immediately upon generation of the color measurement data, whether automatically or manually, or may be effectuated at a future point in time, e.g., when it is desirable to review historical color measurement data based on an alternative, currently relevant color calibration standard.

According to exemplary embodiments of the present disclosure, color measurement data generated by a first color measuring instrument is stored in computer memory, either locally or at a remote location. The color measurement data may be advantageously stored in multiple formats, i.e., pre- and post-transform. Thus, the color measurement data may be accessible from computer memory based on multiple color calibration standards, i.e., based on different centroids, and may be viewed in a variety of forms, e.g., in graphical and/or tabular format.

In an exemplary embodiment of the present disclosure, a color measuring instrument communicates, either directly or indirectly, with a processor and computer memory. The computer memory contains at least one data transform or delta profile that facilitates transformation of color measurement or spectral data from a first color calibration standard to a second color calibration standard. The processor is adapted to access the at least one data transform or delta profile and, upon user request, to transform color measurement data generated by the color-measuring instrument from the first to the second color calibration standard. The user request may be made manually, e.g., using a keyboard or other input means that communicates with the processor, or may be automatically initiated, e.g., based on programming command(s) that cause the at least one data transform or delta profile to be automatically initiated upon generation of color measurement data by the color-measuring instrument.

In a further exemplary embodiment of the present disclosure, a "model transform" or delta profile may be applied automatically to "profiled spectral data" at the time when that data is received at a second location, i.e., a location distinct from the location where the measurements were taken. The model transform used to correlate the profiled spectral data to a desired standard, e.g., the color standard employed by a color-measuring instrument at such distinct location, is selected based on previously established rule(s), e.g., the desired comparison standard for purposes of evaluating the profiled spectral data which may, for example, be based on the model/type of color-measuring instrument at a given location. As used herein, "profiled spectral data" is measurement data obtained from a color-measuring instrument for which a set of corrections have been generated allowing that instrument to better correlate to an established virtual standard, and a "model transform" is a series of corrections that can be applied to profiled spectral data to make them better correlate with an instrument of a specific make or model.

Applying a dynamic transform, i.e., a model transform or delta profile that is applied in a dynamic manner, may take the form of a two part process. First, the color-measuring instrument, e.g., the spectrophotometer, at a first location is profiled, thereby accounting/correcting for any performance characteristic changes ("drifts") over time. By profiling, the disclosed method/system advantageously brings all instruments of a particular make/manufacturer to the same standard of measurement. Advantageous profiling techniques and technologies for generating profiled spectral data are disclosed in commonly assigned U.S. Pat. No. 6,043,894 to Van Aken et al.

Second, a model transform or delta profile is applied to the profiled spectral data when a user of the disclosed system/method desires to have spectral data generated by different color-measuring instrument(s) appear to have been generating using the same color standard, i.e., to be directly comparable. Thus, in an exemplary embodiment of the present disclosure, customers and their extended enterprise, e.g., supply chains, etc., may view spectral data in a form that permits effective decision-making, regardless of the measurement site and color-measuring instrument that originally generated the spectral data.

According to an exemplary embodiment of the disclosed system/method, a central or distributed server is provided that is programmed to communicate with discrete color-measuring instruments at one or more distinct locations, i.e., across a network. The server is advantageously programmed to receive and store identification information, e.g., log-in and/or registration information, with respect to color-measuring instruments at such distinct locations. The log-in/registration information is advantageously associated with information that reflects the type of color-measuring instrument involved in generating spectral data at a specific location. Stated differently, when the disclosed server communicates with a color-measuring instrument at a distinct location, the server is advantageously programmed to automatically determine the type/model of color-measuring instrument employed at such location and to thereby recognize the color standard/centroid associated with spectral data measurements generated at such location, e.g., based on information stored in memory associated with the server.

The disclosed server advantageously maintains one or more "model transforms" or delta profiles that may be applied to profiled spectral data so as to modify such spectral data to correspond to the color standard/centroid employed by one or more different color-measuring instruments. Thus, memory associated with the disclosed server may contain a first "model transform" or delta profile that, when applied to profiled spectral data, automatically modifies such spectral data to correspond to the color standard/centroid of a first type/model of color-measuring instrument. In like measure, memory associated with the server may contain second, third and fourth "model transforms" or delta profiles that, when applied to profiled spectral data, automatically modifies such spectral data to correspond to the color standard/ centroid of second, third and fourth types/models of color-measuring instruments, respectively.

When a color-measuring instrument at a distinct location communicates with the server, e.g., over a network, the server is thus programmed to identify the type/model of such color-measuring instrument, e.g., based on log-in/registration information and/or information stored in memory associated with the server, and will be in a position to transmit to such distinct location the appropriate model transform/delta profile, i.e., the model transform required to modify profiled spectral data to correspond to the color standard/centroid of such color-measuring instrument. The model transforms maintained in the memory associated with the server may be updated/revised from time-to-time, e.g., to reflect refinements thereto. Thus, color-measuring instruments that communicate with the server on a periodic basis may receive an updated and/or replacement model transform in response to such periodic communication(s).

The model transform(s) or delta profile(s) transmitted by the server to individual color-measuring instrument locations are typically stored on memory associated with such color-measuring instrument. The model transform may then be applied to profiled spectral data transmissions that are subsequently received at such color-measuring instrument location. Alternatively, the required model transform/delta profile may be downloaded from a remote location on an as-needed basis, by such color-measuring instrument. The dynamic application of a model transform or delta profile to profiled spectral data at such location advantageously permits the color standard/centroid of such profiled spectral data to be modified at such location, and thereafter facilitates evaluations and/or analyses in which the dynamically transformed spectral data is evaluated/analyzed/compared relative to spectral data generated by the color-measuring instrument physically located at such location and/or profiled spectral data transmitted to such location from other color-measuring instruments (or at other times from the same color-measuring instrument.

According to the present disclosure, the type/model of the color-measuring instrument at a given location is determinative of the model transform or delta profile to be applied to any profiled spectral data transmitted thereto. In other words, the same model transform or delta profile may be applied to all profiled spectral data transmitted to location "A", regardless of the type/model of color-measuring instrument used to generate such spectral data at a distinct location "B". By applying the appropriate model transform or delta profile at location "A", the profiled spectral data is automatically restandardized to the color standard/centroid of the color-measuring instrument at location "A". If profiled spectral data were transmitted from location "A" to location "B" according to an advantageous embodiment of the present disclosure, a model transform or delta profile associated with the color-measuring instrument at location "B" would be applied to such profiled spectral data, thereby dynamically transforming the spectral data to correspond to the color standard/centroid associated with the color-measuring instrument that is physically located at location "B".

Additional advantageous features and functions associated with the disclosed systems and methods will be apparent from the detailed description which follows, particularly when viewed in conjunction with the appended figures.

BRIEF DESCRIPTION OF THE DRAWINGS

So that those of ordinary skill in the art to which the subject disclosure pertains will more readily understand how to make and use the systems and methods described herein, aspects of preferred embodiments of the present disclosure will be described in detail with reference to the drawings, wherein.

DETAILED DESCRIPTION OF EXEMPLARY EMBODIMENT(S)

As noted above, the present disclosure provides advantageous systems and methods for selectively manipulating and/or restandardizing color measurement or spectral data, such that users are able to mix or employ different color-measuring instrument types more easily and effectively. The disclosed systems and methods advantageously facilitate selective transformation of color measurement data gathered by a first manufacturer's color-measuring instrument, so that the resultant color measurement data may be evaluated as though it was generated by another manufacturer's color-measuring instrument.

Figure 1:
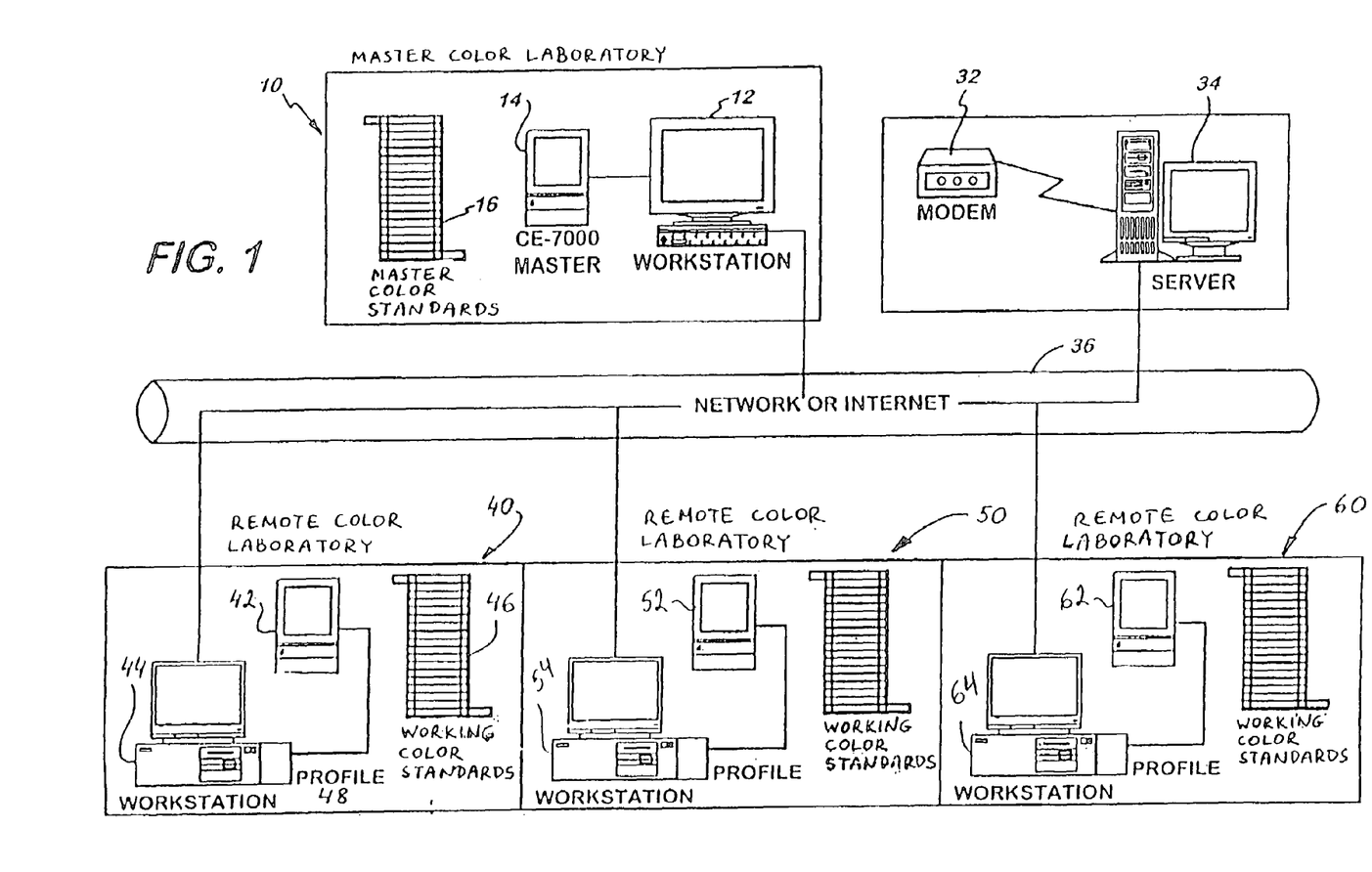
FIG. 1 is a schematic diagram showing an exemplary managed network of color-measuring instruments, in which the systems and methods of the present disclosure may be advantageously practiced.

Referring now to the drawings wherein like reference numerals identify similar features or characteristics of the systems and methods disclosed herein, a managed network of color 5 measuring instruments is illustrated in FIG. 1. Remote color laboratories 40, 50, 60, etc. are connected to a central or master color laboratory 10 through a dedicated network or through the Internet 36. In case of a dedicated network, connections to a server 34 may be maintained using modem 32. Alternative network communication modalities are also contemplated, as would be readily apparent to persons skilled in the art, e.g., router-based systems and applications, virtual private networks (VPNs), WiFi applications, and the like.

Color measuring instruments 42, 52, 62 (e.g., spectrophotometers or colorimeters) are located at the respective remote color laboratories. The color measuring instruments are adapted to make color measurements, as are known in the art. Thus, to the extent color measuring instruments 42, 52, 62 are spectrophotometers, measurements are made as to spectral reflectance or transmittance. The color calibration standard used by and/or associated with each individual spectrophotometer determines the characteristics or centroid of the color measurement data generated thereby. For color measuring instruments produced by different manufacturers, it is possible, if not likely, that the color measurement data generated will be based upon differing color calibration standards, i.e., the color measurement data will have different centroids.

Figure 2:
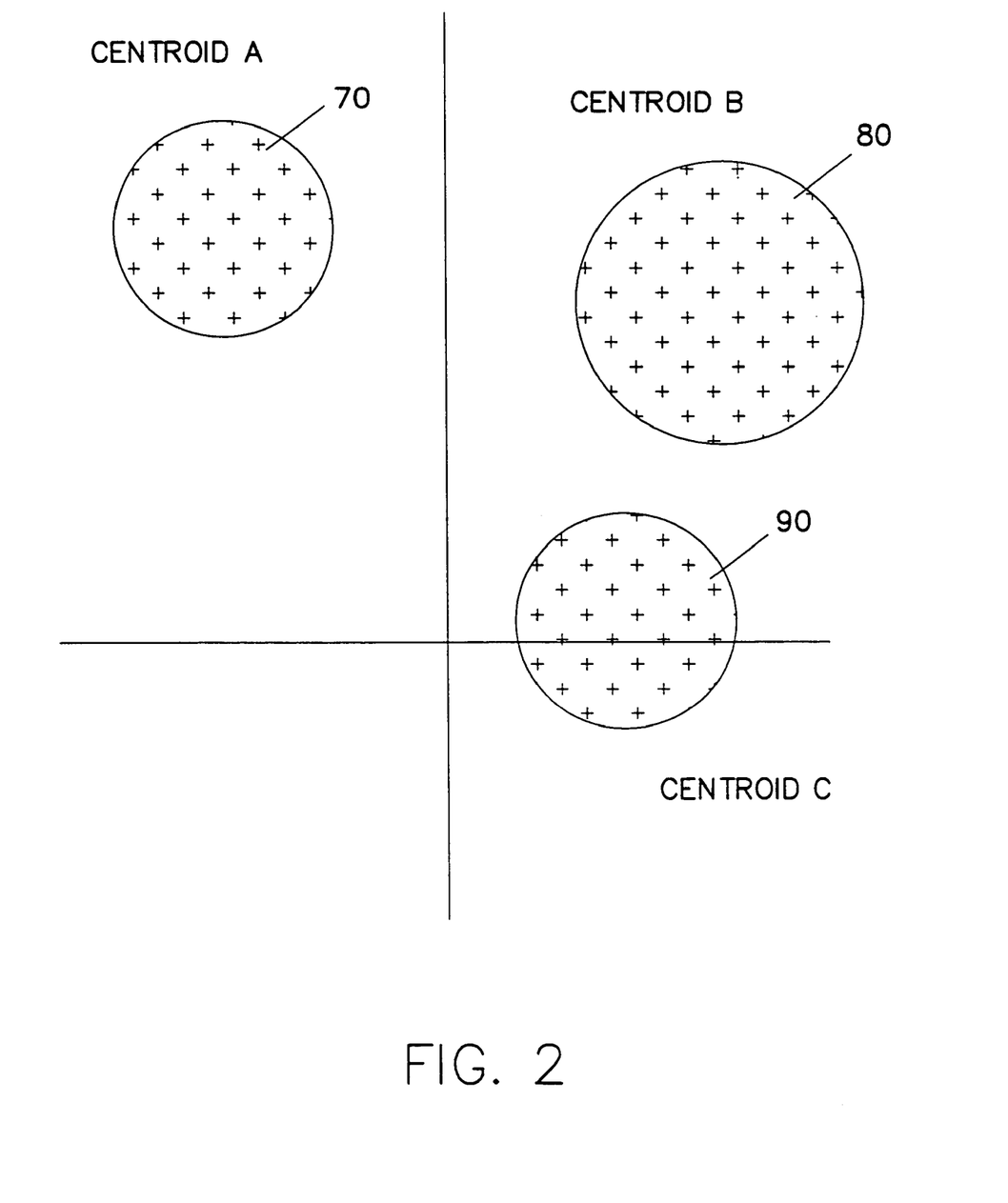
FIG. 2 shows two-dimensional plots (not to scale) representing Centroids A, B, and C associated with color measurement data generated by color-measuring instruments manufactured by three different manufacturers, e.g., Companies A, B, and C. The centroid variance schematically depicted in FIG. 3 has been exaggerated for clarity and is not intended to be representative of centroid variant levels that are likely to be encountered in color measurement applications of the system/method of the present disclosure.

With reference to FIG. 2, schematic representations of color measurement data that is generated based on differing color coordinate systems are provided. The centroids that are schematically depicted in FIG. 2 are labeled as Centroid A (element 70), Centroid B (element 80) and Centroid C (element 90), and correspond to hypothetical color measurement data for the same sample generated by color measuring instruments produced by Companies A, B and C, respectively. Generally, the plots representing measurements of the same color sample performed on instruments from the same manufacturer will substantially align or overlap. As is readily apparent from the schematic depiction of FIG. 2, however, a comparison of the color measurement data associated with Centroids A, B and C is essentially impossible, because centroids 70, 80, 90 are graphically displaced based on the differing color calibration standards utilized by or associated with the different color measuring instruments.

Thus, as illustrated in FIG. 2, centroids 70, 80, 90 for color measurement data generated by color measuring instruments produced by different manufacturers are generally distinctly different and not susceptible to visual analysis or comparison. However, according to exemplary embodiments of the present disclosure, data transforms or delta profiles may be created and utilized to restandardize color measurement data for unrelated color measuring instruments, thereby permitting color measurement data to be easily and effectively analyzed and/or compared. The data transforms are typically generated based on correlations between sets of color measurement data for the respective color measuring instruments. Typically, the data transforms or delta profiles take the form of algorithmic formula(e) or set(s) of steps which may be derived in known ways and may be expressed in any conventional computer language.

According to exemplary embodiments of the present disclosure, multiple data transforms or delta profiles may be derived, such that color measurement data may be selectively transformed to correspond to the centroids associated with a plurality of manufacturers' color measuring instruments. The data transforms are typically stored in a computer memory, e.g., a computer memory located on-site (e.g., associated with workstation 44, 54, 64), or at a remote and/or central location (e.g., associated with a server at master color laboratory 10). The manufacturer-specific data transforms or delta profiles located in the computer memory can then be used to selectively profile or restandardize spectral data gathered by color-measuring instrument(s), e.g., at the one or more remote color laboratories. The profiling can be achieved with the help of calculations and optimizations disclosed in U.S. Pat. No. 6,043,894 to Van Aken et al., assigned to GretagMacbeth LLC, the disclosure of which is hereby incorporated by reference.

To illustrate a network-based application of the disclosed systems and methods, and with reference to FIG. 1, the remote color laboratory 40 may include a spectrophotometer 42 manufactured by Company A; the remote color laboratory 50 may include a spectrophotometer 52 manufactured by Company B; and the remote color laboratory 60 may include a spectrophotometer 62 manufactured by Company C. The remote color laboratories 40, 50 and 60 may be connected to the master color laboratory 10 through a dedicated network or through the Internet 36. The master workstation 12 may include a processor, e.g., a server, that accesses a computer memory within which is stored data transforms or delta profiles for converting color measurement data between Centroids A, B and C.

For illustration purposes, at the request of a user at workstation 44, the master color laboratory 10 may be called upon to send or transmit to the remote color laboratory 40 data transform(s) or delta profile(s) for reprofiling or restandardizing color measurement data generated by a spectrophotometer from Company A, to color measurement data produced by a spectrophotometer from Company B, or Company C, or both. The data transform(s) may be stored in the memory associated with workstation 44 or may be utilized by workstation 44, and "discarded" (i.e., not retained in memory). Alternatively, the color measurement data generated at remote color laboratory 40 may be transmitted to a distinct location for reprofiling/restandardizing (e.g., master color laboratory), and the reprofiled color measurement data may be subsequently transmitted to color laboratory 40 (or elsewhere, as may be desired). Application of the data transform or delta profile to the color measurement data is undertaken by an appropriate processor, e.g., the processor associated with workstation 44, and the transformed data may be displayed on a monitor, printed out on a printer, stored in a database, and/or otherwise used for analysis or comparison, as will be apparent to persons skilled in the art. Color measurement data profiling is described in U.S. Pat. No. 6,043,894 to Van Aken et al.

Of note, the color measuring instrument and associated componentry, e.g., an associated workstation and processor, may be advantageously programmed to receive and apply the data transform or delta profile, as described herein. However, in certain instances, such programming may not be easily implemented, e.g., if the color measuring instrument does not include such profiling functionality. In such circumstance, it may be desirable to employ certain proprietary interception technology which is disclosed and claimed in a commonly owned U.S. patent application Ser. No. 10/314,095, which was filed on Dec. 6, 2002, and entitled "Method and System for Processing Color-Measurement Data," the entire contents of which are hereby incorporated by reference.

Based on the advantageous implementation of the systems and methods disclosed herein, color measurement data generated using a spectrophotometer or colorimeter manufactured by Company A may be selectively caused to read as if generated by a color measuring instrument manufactured by Company B or Company C. or both. Additional data transforms or delta profiles would permit the color measurement data to be viewed as if generated by additional manufacturers, as will be apparent to persons skilled in the art. Data transforms or delta profiles may be periodically verified, based on current color data measurements from current color measurement instruments from the manufacturers of interest. However, it may be desirable to retain historic data transform algorithms, so as to permit accurate transformations of historical color measurement data. Appropriate file management, e.g., assigning date ranges for specific data transforms or delta profiles, within the applicable databases will permit users to access the most appropriate data transform(s) or delta profile(s) for use with specific color measurement data.

Thus, in the exemplary network-based color management system described above, a user at remote color laboratory 40 will be able to obtain color data measurements that are comparable to the measurements of a user at the remote color laboratory 50, notwithstanding the fact that instruments from different manufacturers are being used. Similarly, the data obtained by the color measuring instrument 42 at the remote color laboratory 40 can be profiled to read as if it was gathered by a spectrophotometer manufactured by Company C. For example, the master color laboratory 10 may send or transmit the applicable data transform algorithm associated with Centroid C to the remote color laboratory 40. Then, the measurements of the user at the remote color laboratory 40 may be selectively reprofiled so as to be comparable to the measurements of the user at the remote color laboratory 60.

In a further exemplary embodiment of the present disclosure, a method is provided that includes the steps of: (i) providing a data transform or delta profile for reprofiling or restandardizing color measurement data generated using a first color calibration standard to a second color calibration standard, (ii) obtaining color measurement or spectral data using a first color measuring instrument based on the first color calibration standard; and (iii) selectively transforming the color measurement or spectral data using the data transform or delta profile, so as to reprofile or restandardize the color measurement or spectral data to the second color calibration standard. As noted above, the data transform or delta profile may be based on obtaining typical color measurement profiles based on the first and second color calibration standards, and generating a conversion algorithm for transforming color measurement or spectral data based thereon. The data transform or delta profile is typically stored in an appropriate computer memory, and is accessed from the computer memory on an as-needed basis by an associated processor when data transformation is desired by a user. The computer memory may be located at a central location, e.g., a master color laboratory, or on-site, e.g., in computer memory associated with a local workstation that cooperates with a color-measuring instrument.

A color measuring instrument may thus be provided according to the present disclosure that communicates, either directly or indirectly, with a processor and computer memory. The computer memory contains at least one data transform or delta profile that facilitates transformation of color measurement or spectral data from a first color calibration standard to a second color calibration standard. The processor is adapted to access the at least one data transform or delta profile and, upon user request, to transform color measurement data generated by the color-measuring instrument from the first to the second color calibration standard. The user request may be made manually, e.g., using a keyboard or other input means that communicates with the processor, or may be automatically initiated, e.g., based on programming command(s) that cause the at least one data transform or delta profile to be automatically initiated upon generation of color measurement data by the color-measuring instrument.

Figure 3:
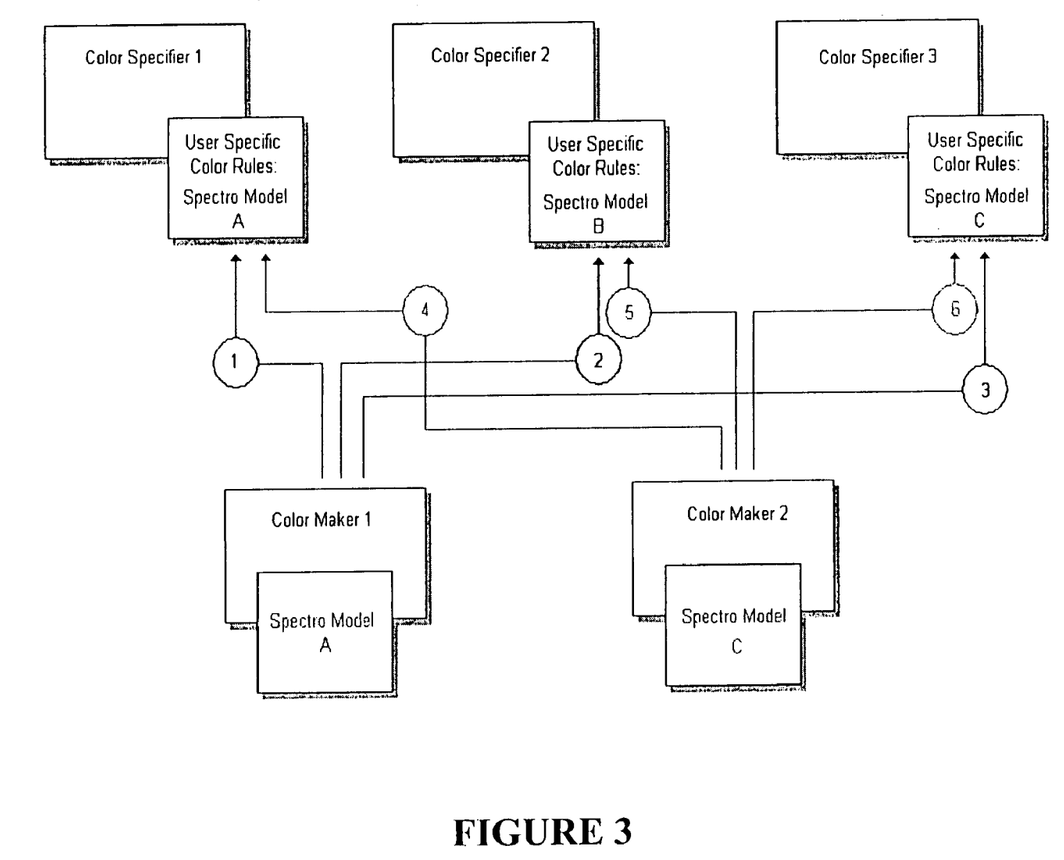
FIG. 3 is a schematic diagram showing an exemplary exchange of profiled spectral data between a series of color measuring instruments according to the present disclosure.

Turning to FIG. 3, a further schematic flowchart is provided that illustrates a system 100 for transmission of profiled spectral data between color-measuring instruments at distinct locations is provided. FIG. 3 maps out various data exchanges between instruments of different makes and models and, more particularly, schematically represents a workflow in which multiple color makers, with instruments of types A and C, are exchanging color data with three color specifiers, who have instruments of types A, B, and C. According to exemplary system 100, all participants in the networked communications are using profiled instruments, i.e., color-measuring instruments wherein the spectral data is profiled, thereby accounting or correcting for any performance characteristic changes ("drifts") over time. Profiling brings all instruments of a particular make/manufacturer to the same standard of measurement. (See U.S. Pat. No. 6,043,894 to Van Aken et al.).

With further reference to FIG. 3, according to system 100 the following dynamic transforms are applied:

Data exchange between Color Maker 1 (element 102) using Spectrophotometer Model A (element 104) and Color Specifier 1 (element 106) using Spectrophotometer Model A (element 108) is depicted by Arrow #1. Color Maker 1 and Color Specifier 1 are typically in geographically distinct locations. In connection with spectral data exchange between Color Maker 1 and Color Specifier 1, no model transform is applied to the spectral data communicated therebetween according to system 100 because both instruments 104, 108 are of the same type.

Data exchange between Color Maker 1 (element 102) using Spectrophotometer Model A (element 104) and Color Specifier 2 (element 110), using Spectrophotometer Model B (element 112) is depicted by Arrow #2. In this case, the profiled spectral data which is measured by Color Maker 1 using Spectrophotometer A is dynamically model transformed upon receipt by Color Specifier 2 to agree with Spectrophotometer B, i.e., such spectral data is restandardized to the color standard/centroid associated with Spectrophotometer B (element 112). After such dynamic transform is applied at Spectrophotometer B (element 112), the spectral data transmitted from Color Maker 1 (element 102) may be effectively analyzed, evaluated and/or compared relative to spectral data generated by Spectrophotometer B because such spectral data will share the same color standard/centroid.

Data exchange between Color Maker 1 (element 102) using Spectrophotometer Model A (element 104) and Color Specifier 3 (element 114), using Spectrophotometer Model C (116) is depicted by Arrow #3. In this case, the profiled spectral data that is measured by Color Maker I using Spectrophotometer A (element 104), is dynamically transformed using an appropriate model transform/delta profile upon receipt by Color Specifier 3 (element 114) to agree with the standard/centroid associated with Spectrophotometer C (element 116).

Data exchange between Color Maker 2 (element 118) using Spectrophotometer Model C (element 120) and Color Specifier 1 (element 106), using Spectrophotometer Model A (element 108) is depicted by Arrow #4. In this case, the profiled spectral data measured by Color Maker 2 using Spectrophotometer C is dynamically model transformed upon receipt by Color Specifier 1 to agree with color standard/centroid associated with Spectrophotometer A (element 108).

Data exchange between Color Maker 2 (element 118) using Spectrophotometer Model C (element 120) and Color Specifier 2 (element 110) using Spectrophotometer Model B (element 112) is depicted by Arrow #5. In this case, the profiled spectral data measured by Color Maker 2 using Spectrophotometer C is dynamically model transformed upon receipt by Color Specifier 2 to agree with color standard/centroid associated with Spectrophotometer B.

Data exchange between Color Maker 2 (element 118) using Spectrophotometer Model C (element 120) and Color Specifier 3 (element 114), using Spectrophotometer Model C (element 116) is depicted by Arrow #6. In this case, since both instruments are of the same type, no model transform is applied in order for Color Specifier 3 to analyze, evaluate and/or compare spectral data received from Color Maker 2 with spectral data generated by Spectrophotometer Model C (element 116) located at the facility of Color Specifier 3.

Of note, spectral data communications associated with system 100 that flow in the direction opposite to Arrows 1–6, e.g., from a Color Specifier to a Color Maker, may also advantageously utilize model transforms or delta profiles to modify the color standard/centroid, as necessary to facilitate effective analyses, evaluations and/or comparisons. According to system 100, the type/model of the color-measuring instrument (i.e., spectrophotometer) at a given location is determinative of the model transform or delta profile to be applied to profiled spectral data transmitted to such location. Thus, the type/model of the spectrophotometer at the transmitting location has no effect on the model transform or delta profile employed at the receiving end of the spectral data transmission.

A central or distributed server (not pictured) may be provided as part of system 100. The server may be advantageously programmed to communicate with color-measuring instruments 104, 108, 112, 116, 120 across a network, e.g., an intranet, extranet and/or the Internet. The server is advantageously programmed to receive and store identification information, e.g., log-in and/or registration information, with respect to the color-measuring instruments, i.e., spectrophotometers 104, 108, 112, 116, 120 and the log-in/registration information is advantageously associated with information that reflects the type of color-measuring instrument involved in generating spectral data at each specific location. Thus, when the server communicates with a color-measuring instrument located at the facility of a Color Maker or a Color Specifier, the server is advantageously programmed to automatically determine the type/model of color-measuring instrument employed at such location and to thereby recognize the color standard/centroid associated with spectral data measurements generated at such location, e.g., based on information stored in memory associated with the server.

The server generally maintains one or more model transforms or delta profiles that may be applied to profiled spectral data so as to modify such spectral data to correspond to the color standard/centroid employed by the foregoing spectrophotometers. In the case of system 100, memory associated with the server typically contains a model transform or delta profile for restandardizing profiled spectral data to the color standard/centroid associated with each of Spectrophotometer Model A (elements 104, 108), Spectrophotometer Model B (elements 112), and Spectrophotometer Model C (elements 116, 120).

When a spectrophotometer at the facility of a Color Maker or a Color Specifier (or another location involved in color-related activities) communicates with the server over the network, the server is programmed to identify the type/model of such color-measuring instrument, e.g., based on log-in/registration information and/or information stored in memory associated with the server, and will be in a position to transmit to such facility the appropriate model transform/delta profile, i.e., the model transform required to modify profiled spectral data to correspond to the color standard/centroid of the spectrophotometer located at such facility. The model transforms maintained in the memory associated with the server may be updated/revised from time-to-time. Thus, spectrophotometers that communicate with the server on a periodic basis may receive an updated and/or replacement model transform in response to such periodic communication(s).

According to exemplary system 100, spectrophotometers 108, 112 and 116 have model transform(s) or delta profile(s) stored on memory associated with each such color-measuring instrument. The model transform is then applied to profiled spectral data transmissions that are subsequently received at such location. Alternatively, the required model transform/delta profile may be downloaded from a remote location on an as-needed basis, by such spectrophotometer. In short, the dynamic application of a model transform or delta profile to profiled spectral data at such location advantageously permits the color standard/centroid of such profiled spectral data to be modified at such location, and thereafter facilitates evaluations and/or analyses in which the dynamically transformed spectral data is evaluated, analyzed and/or compared relative to spectral data generated by the color-measuring instrument physically located at such location and/or profiled spectral data transmitted to such location from other color-measuring instruments (or at other times from the same color-measuring instrument).

Thus, the systems and methods of the present disclosure allow users to transform color measurement data such that readings from different manufacturers' instruments may be compared and analyzed, thereby allowing users to mix instrument types more easily and effectively. While the invention has been described with respect to specific exemplary embodiments set forth herein, those skilled in the art will readily appreciate that various modifications, changes, and enhancements may be made thereto without departing from the spirit or scope of the present invention.

What is claimed is:

1. A method for transforming color measurement data, comprising:
   (a) providing a data transform or delta profile, the data transform or delta profile transforming color measurement data from a first color calibration standard to a second color calibration standard used by a second color measuring instrument;
   (b) obtaining color measurement data using a first color measuring instrument based on the first color calibration standard; and
   (c) selectively transforming the color measurement to a desired color calibration standard data using the data transform or delta profile, so as to restandardize the color measurement data to the second color calibration standard;
   wherein the selective transformation restandardizes the color measurement data from a first centroid based on said first color calibration standard associated with a first color instrument type to a second centroid based on said second color calibration standard associated with a second color instrument type.

2. The method of claim 1, wherein the data transform or delta profile is stored in a computer memory and is accessed by a processor.

3. The method of claim 1, wherein said selective transformation is effected in response to a user command.

4. The method of claim 1, wherein said selective transformation is effected automatically upon obtaining color measurement data using the first color measurement data.

5. The method of claim 1, further comprising comparing the restandardized color measurement data to other color measurement data generated using the second color calibration standard.

6. The method of claim 1, further comprising updating the data transform or delta profile based on current color measurement data measurements.

7. The method of claim 1, wherein the first color measuring instrument is a spectrophotometer.

8. The method of claim 1, wherein the first color measuring instrument is a colorimeter.

9. The method of claim 1, wherein a plurality of data transforms or delta profiles are provided, each of the plurality of data transforms or delta profiles permitting transformation of color measurement data between distinct color calibration standards.

10. A network-based method for transforming color measurement data, comprising:
  (a) providing a data transform or delta profile, the data transform or delta profile transforming color measurement data at a first network location from a first color calibration standard to a second color calibration standard used by a second color measuring instrument;
  (b) obtaining color measurement data using a first color measuring instrument based on the first color calibration standard at a second network location; and
  (c) selectively transforming the color measurement to a desired color calibration standard data using the data transform or delta profile, so as to restandardize the color measurement data to the second color calibration standard;
  wherein the selective transformation restandardizes the color measurement data from a first centroid based on said first color calibration standard associated with a first color measuring instrument type to a second centroid based on said second color calibration standard associated with a second color measuring instrument type.

11. The method of claim 10, further comprising transmitting the data transform or delta profile from the first network location to the second network location across a network to permit the selective transformation.

12. The method of claim 10, further comprising transmitting the color measurement data from the second network location to the first network location across a network to permit the selective transformation.

13. The method of claim 10, wherein said first network location includes a server that communicates with the first color measuring instrument and a plurality of other color measuring instruments across a network.

14. The method of claim 10, further comprising transmitting the restandardized color measurement data across a network for comparison with additional color measurement data that is based on the second color calibration standard.

15. The method of claim 10, wherein a plurality of data transforms or delta profiles are provided, each of the plurality of data transforms or delta profiles permitting transformation of color measurement data between distinct color calibration standards.

16. A system for transformation of color measurement data, comprising:
  a processor in communication with memory, wherein;
  the memory contains at least one data transform or delta profile, the data transform or delta profile transforming color measurement data from a first color calibration standard used by a first color measuring instrument to a second color calibration standard used by a second color measuring instrument; and further wherein
  the processor is programmed to access the at least one data transform or delta profile and to run the data transform or delta profile so as to transform color measurement data generated by the first color measuring instrument from the first color calibration standard to the second color calibration standard;
  wherein the transformation restandardizes the color measurement data to a desired color calibration standard from a first centroid based on said first color calibration standard associated with a to a second centroid based on said second color calibration standard associated with a second color measuring instrument type.

17. The system of claim 16, further comprising a color-measuring instrument in communication with the processor.

18. The system of claim 16, wherein the processor runs the data transform or delta profile in response to a user command.

19. The system of claim 16, wherein said processor communicates with a network, and color measurement data that is transformed by the running of the data transform or delta profile is transmitted to at least one remote location across the network by the processor.

* * * * *